US012544960B2

(12) United States Patent
Lim et al.

(10) Patent No.: US 12,544,960 B2
(45) Date of Patent: Feb. 10, 2026

(54) METHOD AND APPARATUS FOR MANUFACTURING COMPOSITE MATERIAL

(71) Applicants: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

(72) Inventors: Sang Won Lim, Seoul (KR); Sang Jae Yoon, Yongin-si (KR); Young Bin Park, Ulsan (KR); Woo Seok Ji, Ulsan (KR); Soo Chang Kang, Ulsan (KR); Seong Woo Im, Ulsan (KR)

(73) Assignees: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 68 days.

(21) Appl. No.: 18/229,508

(22) Filed: Aug. 2, 2023

(65) Prior Publication Data
US 2024/0157613 A1    May 16, 2024

(30) Foreign Application Priority Data
Nov. 10, 2022 (KR) .......................... 10-2022-0149496

(51) Int. Cl.
B29C 43/58       (2006.01)
B29C 43/18       (2006.01)
(Continued)

(52) U.S. Cl.
CPC .............. *B29C 43/58* (2013.01); *B29C 43/18* (2013.01); *B29C 70/48* (2013.01); *B29C 70/54* (2013.01); *B29C 2043/5808* (2013.01)

(58) Field of Classification Search
CPC ....... B29C 43/58; B29C 43/18; B29C 70/467; B29C 70/78
See application file for complete search history.

(56) References Cited

U.S. PATENT DOCUMENTS 4,168,331 A * 9/1979 Davis ................... C08G 59/066
                                                             427/386
10,105,878 B2 10/2018 Usui et al.
(Continued)

FOREIGN PATENT DOCUMENTS

CN       111300845 A    6/2020
JP       H08132493 A    5/1996
(Continued)

OTHER PUBLICATIONS

Kim, R.-W., C.-M. Kim, K.-H. Hwang, S.-R. Kim, Embedded Based Real-Time Monitoring in the High-Pressure Resin Transfer Molding Process for CFRP, Applied Sciences, vol. 9 (2019), 15 pages. (Year: 2019).*

*Primary Examiner* — Matthew J Daniels
(74) *Attorney, Agent, or Firm* — Lempia Summerfield Katz LLC

(57) ABSTRACT

A method of manufacturing a composite material through a wet compression molding (WCM) process is disclosed. The internal pressure of a mold is controlled so that productivity may be improved due to process automation through application of a resin using a robot. Quality of the composite material may be improved due to minimization of deformation of a foam core through control of the internal pressure of the mold.

16 Claims, 4 Drawing Sheets

(51) Int. Cl.
*B29C 70/48* (2006.01)
*B29C 70/54* (2006.01)

(56) References Cited

U.S. PATENT DOCUMENTS

| | | |
|---|---|---|
| 2017/0297235 A1 | 10/2017 | Usui et al. |
| 2018/0029315 A1 | 2/2018 | Howland et al. |
| 2021/0214549 A1* | 7/2021 | Teragaki ................. C08L 51/04 |

FOREIGN PATENT DOCUMENTS

| | | |
|---|---|---|
| JP | 2005186286 A | 7/2005 |
| JP | 6402776 B2 | 9/2018 |
| KR | 20190042910 A | 4/2019 |
| KR | 102144435 B1 | 8/2020 |
| KR | 102300520 B1 | 9/2021 |
| WO | 2018077564 A1 | 5/2018 |

* cited by examiner

METHOD AND APPARATUS FOR MANUFACTURING COMPOSITE MATERIAL

CROSS-REFERENCE TO RELATED APPLICATION

This application claims under 35 U.S.C. § 119(a) the benefit of priority to Korean Patent Application No. 10-2022-0149496 filed on Nov. 10, 2022, the entire contents of which are incorporated herein by reference.

BACKGROUND

(a) Technical Field

The present disclosure relates to a method and apparatus for manufacturing a composite material.

(b) Background Art

Generally, a wet compression molding (WCM) process is used to manufacture composite materials by applying a resin to a fabric, impregnating it with the resin, and curing it to complete the manufacturing process. However, the WCM process may cause problems, such as disorganization of fibers and damage to or deformation of a foam core, due to the high internal pressure (exceeding 100 bar) of a mold.

In a pressure controlled resin transfer molding (PC-RTM) process, a fabric is placed in a mold, which is then closed, and resin is injected into the mold, impregnating the fabric with the resin. The resin is cured to complete the manufacturing of a composite material. The PC-RTM process may suppress the disorganization of fibers and damage to or deformation of a foam core due to the low internal pressure (20 bar or less) of the mold. However, the productivity of the PC-RTM process may decrease when manufacturing products with a large area, as the injection time of the resin can take 100 seconds or more.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. An object of the present disclosure is to provide a method and an apparatus for manufacturing a composite material that may improve the quality of the composite material by minimizing deformation of a foam core using a process of controlling the internal pressure of a mold.

Another object of the present disclosure is to provide a method and an apparatus for manufacturing a composite material that may improve productivity through process automation. The method improves productivity by using a robot for the application of a resin.

In one aspect, the present disclosure provides a method of manufacturing a composite material. The method includes applying a resin to an upper surface of a preform having at least one fiber or foam using a resin injector. The method also includes executing compression molding of the preform having the resin applied thereto by lowering an upper slide of a mold and raising a lower slide of a mold using a press. The method further includes determining whether or not an internal pressure of the mold exceeds a predetermined pressure value using a pressure sensor. The method also includes controlling the internal pressure of the mold by reducing a raising speed of the lower slide upon determining that the internal pressure of the mold exceeds the predetermined pressure value.

In an embodiment, the fiber may include at least one of glass fiber, carbon fiber, boron fiber, regenerated fiber, or any combination thereof.

In another embodiment, the fiber may be provided in a form of at least one of unidirectional fabrics, woven fabrics, or any combination thereof.

In still another embodiment, the resin may include at least one of bisphenol epoxy resins, polyester resins, polyurethane resins, or any combination thereof.

In yet another embodiment, the gel time of the resin may be in a range of 10 seconds to 2 minutes.

In still yet another embodiment, the compressive strength of the foam may be in a range of 10 bar to 100 bar.

In a further embodiment, the preform may include a first layer having a first fiber, a second layer disposed on the first layer and having a second fiber, and a third layer disposed on the second layer and having a third fiber.

In another embodiment, applying the resin to the upper surface of the preform may include applying the resin using a robot of the resin injector. The resin may be applied to the preform by moving a mixing head mounted on the robot and determining whether or not an error occurs in the robot.

In still another embodiment, executing the compression molding of the composite material may include raising the lower slide at a speed in a range of 50 millimeters per second (mm/s) to 100 mm/s when a gap between the upper slide and the lower slide is in a range of 5 mm to 10 mm. Executing the compression molding of the composite material may include raising the lower slide at a speed in a range of 0.5 mm/s to 1.0 mm/s when the gap between the upper slide and the lower slide is in a range of 2 mm to 5 mm. Executing the compression molding of the composite material may include executing the compression molding of the preform.

In yet another embodiment, the method may further include, after executing the compression-molding of the preform, impregnating the preform with the resin by allowing the resin applied to the upper surface of the preform to flow downwards from an interior of the preform.

In still yet another embodiment, the method may further include, when determining whether or not an internal pressure of the mold exceeds a predetermined pressure value, and upon the internal pressure of the mold exceeding the predetermined pressure value, controlling the internal pressure of the mold by adjusting a gap of the mold by increasing a gap between the upper slide and the lower slide.

In another embodiment, controlling the internal pressure of the mold by reducing the raising speed of the lower slide may include reducing the internal pressure of the mold by adjusting the raising speed of the lower slide to 0.01 mm/s to 0.50 mm/s.

In a yet another embodiment, the method may further include, after controlling the internal pressure of the mold, additionally controlling the internal pressure of the mold. Additionally controlling the internal pressure of the mold may include determining whether or not a force of the press becomes 0 kilonewtons (kN) and may include lowering the lower slide when the force of the press becomes 0 kN and the internal pressure of the mold exceeds the predetermined pressure value.

In another embodiment, lowering the lower slide may include reducing the internal pressure of the mold by adjusting a gap between the upper slide and the lower slide by 0.01 mm to 0.10 mm.

In still another embodiment, the method may further include, after additionally controlling the internal pressure of the mold, and upon determining that the internal pressure of the mold becomes equal to or less than the predetermined pressure value, manufacturing the composite material by curing the preform having the resin applied thereto while maintaining the internal pressure of the mold at the predetermined pressure value or below.

In another aspect, the present disclosure provides an apparatus for manufacturing a composite material. The apparatus includes a resin injector configured to apply a resin to an upper surface of a preform. The apparatus also includes a press having an upper slide and a lower slide of a mold. The press is configured to execute compression molding of the preform having the resin applied thereto by lowering the upper slide and raising the lower slide. The apparatus further includes a pressure sensor configured to detect whether or not an internal pressure of the mold exceeds a predetermined pressure value. The press controls the internal pressure of the mold by reducing a raising speed of the lower slide when the internal pressure of the mold detected by the pressure sensor exceeds the predetermined pressure value.

In an embodiment, the resin injector may include a robot for resin application and a high-pressure mixing head mounted on the robot.

Other aspects and embodiments of the disclosure are discussed below.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
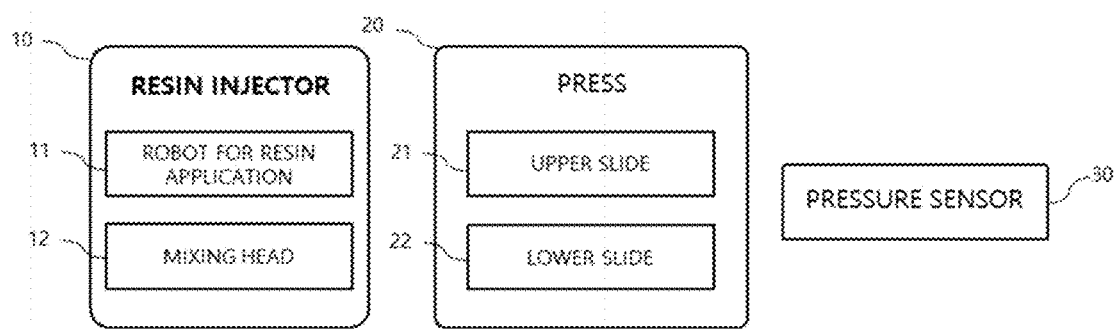
FIG. 1 is a block diagram illustrating a system for executing a method of manufacturing a composite material according to the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, the same reference numbers refer to the same or equivalent parts of the present disclosure throughout the several figures of the drawing.

DETAILED DESCRIPTION

The above-described objects, other objects, advantages, and features of the present disclosure should become apparent from the descriptions of embodiments given hereinbelow with reference to the accompanying drawings. However, the present disclosure is not limited to the embodiments disclosed herein and may be implemented in various different forms. The embodiments are provided to make the description of the present disclosure thorough and to fully convey the scope of the present disclosure to those having ordinary skill in the art.

In the following description of the embodiments, the same elements are denoted by the same reference numerals even when the same elements are depicted in different drawings. In the drawings, the dimensions of structures may be exaggerated, compared to the actual dimensions thereof, for clarity of description. In the following description of the embodiments, terms, such as "first" and "second" may be used to describe various elements but the terms do not limit the elements. These terms are used only to distinguish one element from another element. For example, a "first" element may be named a "second" element, and similarly, a "second" element may be named a "first" element, without departing from the scope and spirit of the disclosure. Singular expressions may encompass plural expressions, unless they have clearly different contextual meanings.

In the following description of the embodiments, terms, such as "including," "comprising," and "having," and variations thereof, are to be interpreted as indicating the presence of characteristics, numbers, steps, operations, elements, or parts stated in the description or combinations thereof. These terms do not exclude the presence of one or more other characteristics, numbers, steps, operations, elements, parts, or combinations thereof, or the possibility of adding the same. In addition, it should be understood that, when a part, such as a layer, a film, a region, or a plate, is referred to as being "on" another part, the part may be located "directly on" the other part or other parts may be interposed between the two parts. In the same manner, it should be understood that, when a part, such as a layer, a film, a region, or a plate, is said to be "under" another part, the part may be located "directly under" the other part or other parts may be interposed between the two parts.

All numbers, values, and/or expressions representing amounts of components, reaction conditions, polymer compositions, and mixtures or blends used in the description are approximations in which various uncertainties in measurement generated when these values are acquired from essentially different things are reflected and thus it should be understood that they are modified by the term "about," unless stated otherwise. In addition, it should be understood that, if a numerical range is disclosed in the description, such a range includes all continuous values from a minimum value to a maximum value of the range, unless stated otherwise. Further, if such a range refers to integer values, the range includes all integers from a minimum value to a maximum value, unless stated otherwise.

When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

The present disclosure relates to a method of manufacturing a composite material. In the method, the composite material is manufactured by applying a resin to a fabric, impregnating the fabric with the resin, and curing the resin in the same manner as the conventional wet compression molding (WCM) process. However, the resin is applied using a robot and is injected within a short time so as to improve productivity. Furthermore, deformation of foam is minimized through the control of the internal pressure of a mold so as to improve the quality of the composite material, in contrast to the conventional WCM process.

Hereinafter, embodiments of the present disclosure are described in detail with reference to the accompanying drawings.

FIG. 1 is a block diagram illustrating a system for executing a method of manufacturing a composite material according to the present disclosure. The present disclosure may be reproduced through interlocking among a resin injector 10, a press 20, and a pressure sensor 30.

The resin injector 10 may include a robot 11 for resin application and a high-pressure mixing head 12 mounted on the robot 11. The resin injector 10 may apply the resin to the upper surface of a preform. The resin injector 10 may apply a resin, which has a short gel time and a quick curing time, using the robot 11, and may shorten a molding time so as to improve productivity. When the resin injector 10 is used, the resin injector 10 is designed to create an injection pressure of 200 bar at most, compared to conventional resin transfer molding (RTM) equipment. Thus, the resin injector 10 may reduce the injection time of the resin to 60 seconds or less to manufacture a product having a large area. Further, a high-pressure mixing method using the mixing head 12 may assure high quality of the composite material through stable mixing and curing, and may enable high-speed molding.

The press 20 may include an upper slide 21 and a lower slide 22 of a mold. The press 20 may lower the upper slide 21 and raise the lower slide 22 so as to execute compression molding of the preform to which the resin is applied by the resin injector 10. The press 20 may precisely control a speed up to at least 0.5 millimeters per second (mm/s), and may be interlocked with the pressure sensor 30 so that the speed of the lower slide 22 and the gap of the mold may be controlled based on a signal from the pressure sensor 30.

The pressure sensor 30 serves to detect whether or not the internal pressure of the mold exceeds a predetermined pressure value. The pressure sensor 30 may be a pressure sensor for high-pressure resin transfer molding (HP-RTM), and may employ a product that may recognize pressure rather than the compressive strength of foam. Further, the pressure sensor 30 is sufficient to recognize a pressure of 200 bar at most due to the characteristics of the WCM process.

The configuration of the system for executing the method of manufacturing the composite according to the present disclosure has been described. Hereinafter, a process executed by the system is described in detail.

The method of manufacturing the composite material according to the present disclosure may include applying a resin to the upper surface of a preform including at least one fiber or foam. The method may also include executing compression molding of the preform impregnated with the resin by lowering the upper slide 21 of the mold and raising the lower slide 22 of the mold using the press 20. The method may further include determining whether or not the internal pressure of the mold exceeds the predetermined pressure value using a mold pressure sensor (i.e., pressure sensor 30). Furthermore, the method may include controlling the internal pressure of the mold by reducing the raising speed of the lower slide 22 upon determining that the internal pressure of the mold exceeds the predetermined pressure value.

Figure 2:
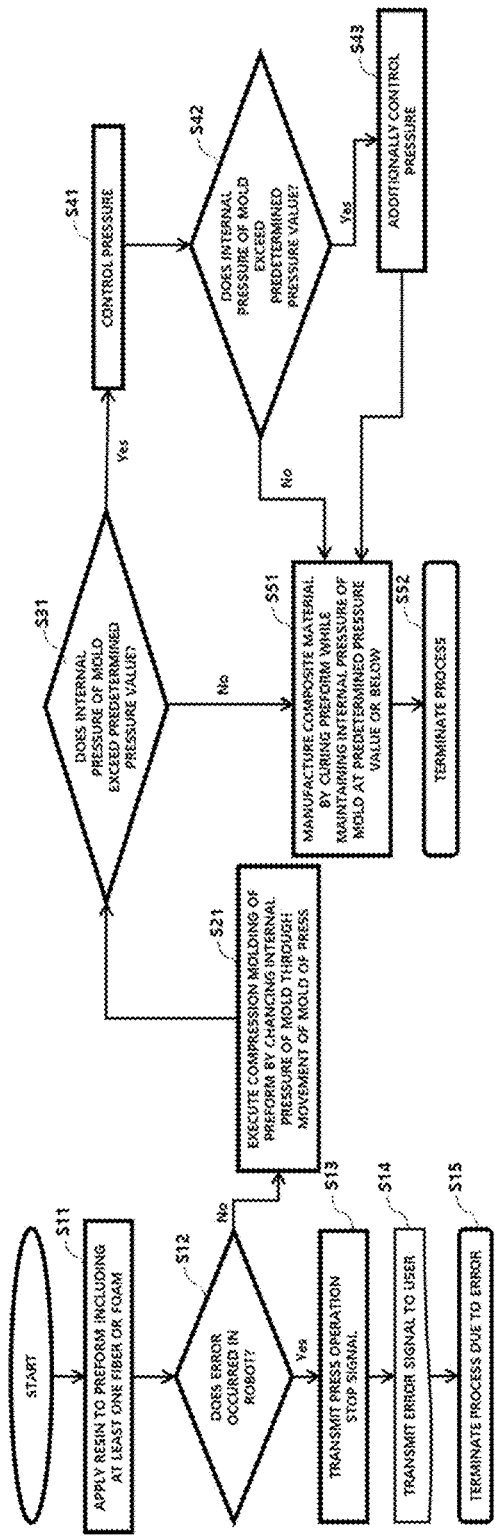
FIG. 2 is a flowchart representing the method according to the present disclosure.

FIG. 2 is a flowchart representing the method according to the present disclosure. The process executed by the system is described in more detail with reference to FIG. 2.

First, the method according to the present disclosure may include applying the resin to the upper surface of the preform including at least one fiber or foam using the robot 11 for resin application (S11).

The fiber may include at least one selected from the group including or consisting of glass fiber, carbon fiber, aramid fiber, boron fiber, regenerated fiber, or any combination thereof, without being limited thereto. Particularly, the fiber may include glass fiber, carbon fiber, or a combination thereof.

The fiber may be provided in the form of at least one selected from the group including or consisting of unidirectional fabrics, woven fabrics having twill woven fabrics, or any combination thereof, without being limited thereto. Particularly, the fiber may be provided in the form of a woven fabric.

The resin may include at least one selected from the group including or consisting of thermosetting resins, including bisphenol epoxy resins, polyester resins, polyurethane resins, or any combination thereof, without being limited thereto. Particularly, the bisphenol epoxy resins are most suitable for mass production as epoxy resins for HP-RTM. The bisphenol epoxy resins are characterized in that they have a viscosity in a range of 100 centipoises (cps) to 900 cps at a temperature of 25° C., a gel time in a range of 10 seconds to 2 minutes, and a glass transition temperature in a range of 60° C. to 180° C. As a result, the bisphenol epoxy resins have excellent viscosity and a short gel time compared to conventional RTM resins.

The foam may be formed of any materials having compressive strength in a range of 5 to 100 bar. The foam may have a hole-processed structure through which the resin may easily pass or may have a structure in which the resin may flow up and down.

The preform may include a first layer having a first fiber, a second layer located on the first layer and having a second fiber, and a third layer located on the second layer and having a third fiber.

In applying the resin to the upper surface of the preform (S11), the resin may flow in an out-of-plane direction.

Figure 3:
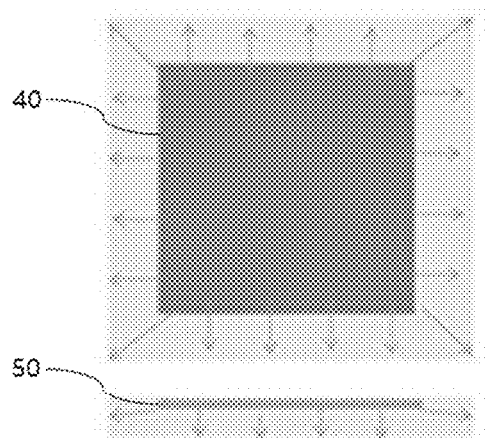
FIG. 3 is a view illustrating flow of a resin in fiber and foam when the resin is applied to a preform according to an embodiment of the present disclosure.
Figure 4:
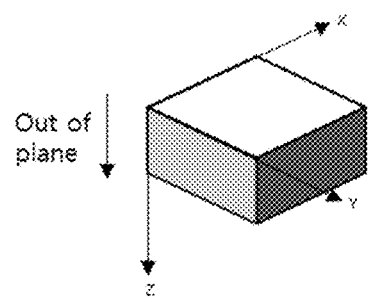
FIG. 4 is a view illustrating an out-of-plane direction.

FIG. 3 is a view illustrating a flow of the resin in the fiber and the foam, when the resin is applied to the preform according to an embodiment of the present disclosure. FIG. 4 is a view illustrating the out-of-plane direction.

Referring to FIG. 3, when the resin is applied to the upper surface of the preform using the resin injector 10, including the robot 11 for resin application and the mixing head 12, the applied resin flows due to the force created when closing the mold by the press 20. The resin flows together with the fiber 40 and passes through the holes formed in the foam 50. When the mold is closed before the resin passes through the holes formed in the foam 50, the internal pressure of the mold is raised. The resin that does not pass through the holes in the foam 50 causes contraction and deformation of the foam 50. The present disclosure may solve these problems by controlling the internal pressure of the mold.

Referring to FIG. 4, in contrast to the RTM process using a resin flowing in the in-plane direction, the resin flows in the out-of-plane direction in the present disclosure. The out-of-plane direction is a direction vertical to a plane structure, and means a direction (the Z-axis direction) vertical to a plane (formed by the X-axis and the Y-axis). In other words, the resin may flow downwards from the inside or interior of the preform so that the preform is impregnated with the resin. In the present disclosure, the resin flows in the out-of-plane direction, and thus an impregnation rate may be increased and a process time may be shortened.

Figure 5:
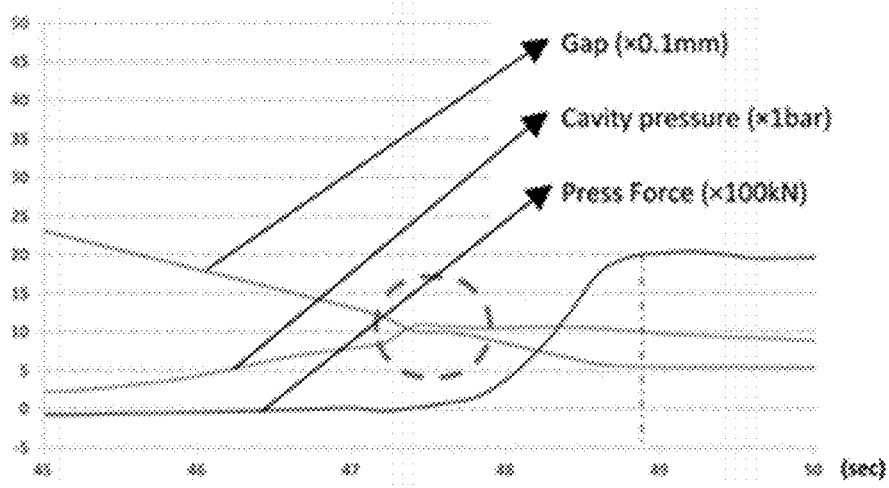
FIG. 5 is a graph representing characteristics of foam according to an embodiment of the present disclosure.

FIG. 5 is a graph representing the characteristics of foam according to an embodiment of the present disclosure. Referring to FIG. 5, the foam may be formed of a material or have a hole-processed structure that allows the resin to pass through it easily. When the internal pressure of the mold exceeds the predetermined pressure value, the speed of the lower slide 22 may be controlled so that the resin may pass through the foam without causing the foam to contract.

Figure 6:
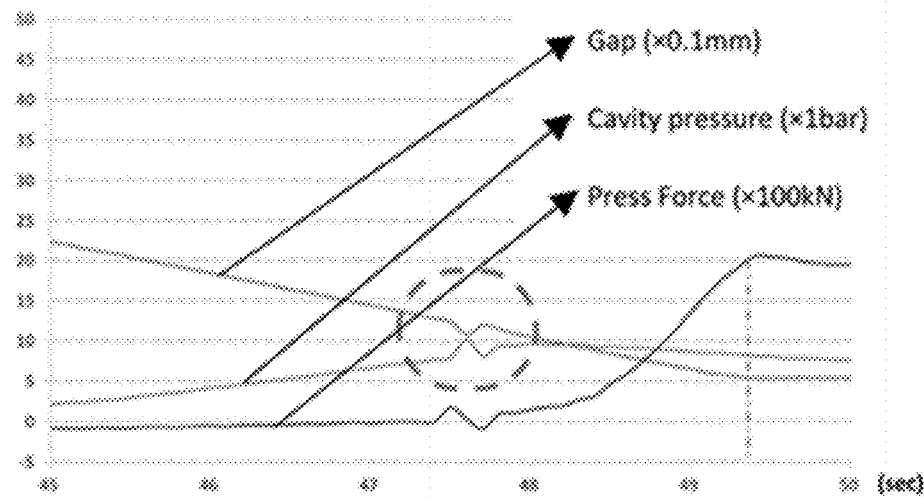
FIG. 6 is a graph representing characteristics of foam according to another embodiment of the present disclosure.

FIG. 6 is a graph representing the characteristics of foam according to another embodiment of the present disclosure. Referring to FIG. 6, the foam may be formed of a material or have a hole-processed structure through which the resin has difficulty passing. Thus, when the internal pressure of the mold exceeds the predetermined pressure value, a gap between mold dies, i.e., the gap of the mold, may be increased so that the resin may pass through the foam without the foam contracting.

In other words, the above-described pressure control methods may be applied together or may be repeated depending on correlations among the foam structure, the viscosity of the resin, and the interface between the fiber and the resin.

Applying the resin to the upper surface of the preform (S11) may include moving the mixing head 12 mounted on the robot 11 of the resin injector 10 to the preform and applying the resin to the preform. After applying the resin to the upper surface of the preform, the method may include determining whether or not an error occurs in the robot 11 (S12).

In applying the resin to the preform, a resin injector operating signal and a press standby signal may be transmitted. The mixing head 12 may be transferred based on the programming of the robot 11, and the resin may be applied to the preform depending on setting conditions. Lastly, the robot 11 may be returned to a standby position.

Upon determining that an error occurs in the robot 11 (Yes in S12), a press operation stop signal for terminating the manufacturing process of the composite material may be transmitted in consideration of mass production (S13). An error message may be transmitted to a user (S14), and then the manufacturing process of the composite material may be terminated due to the error (S15).

Upon determining that no error occurs in the robot 11 (No in S12), compression molding of the preform, to which the resin is applied, is executed by lowering the upper slide 21 of the mold and raising the lower slide 22 of the mold using the press 20 (S21). The press 20 includes the upper slide 21 and the lower slide 22 of the mold. Executing the compression-molding of the composite material may be started by transmitting an operation signal to the press 20 from the resin injector 10.

Executing the compression-molding of the composite material may include raising the lower slide 22 at a speed in a range of 50 mm/s to 100 mm/s when the gap between the upper slide 21 and the lower slide 22 is in a range of 5 mm to 10 mm. Additionally, executing the compression-molding of the composite material may include raising the lower slide 22 at a speed in a range of 0.5 mm/s to 1.0 mm/s when the gap between the upper slide 21 and the lower slide 22 is in a range of 2 mm to 5 mm. Executing the compression-molding of the composite material may include executing the compression molding of the preform (S21).

The method according to the present disclosure may further include, after executing the compression-molding of the preform (S21), impregnating the preform with the resin by allowing the resin applied to the upper surface of the preform to flow downwards from the interior or inside of the preform.

The impregnation direction of the preform with the resin has been described above.

Now, movement of the slides 21 and 22 of the press 20 is described in detail below. The upper slide 21 of the press 20 is first lowered at a speed in a range of 50 mm/s to 700 mm/s, and is then locked. Thereafter, the lower slide 22 of the press 20 is raised at a speed in a range of 50 mm/s to 100 mm/s when the gap between the upper slide 21 and the lower slide 22 is in a range of 5 mm to 10 mm, and is raised at a speed in a range of 0.5 mm/s to 1.0 mm/s when the gap between the upper slide 21 and the lower slide 22 is in a range of 2 mm to 5 mm. The internal pressure of the mold is controlled so as to reach a set value through the above movement.

In the present disclosure, the predetermined pressure value may indicate a pressure value set to be equal to or less than the compressive strength of the preform. In the conventional WCM process, the internal pressure of the mold is increased to 100 bar or more, and, in the PC-RTM process, productivity is reduced due to the low internal pressure of the mold which is at 10 bar or less. Therefore, the predetermined pressure value may be, for example, in a range of 10 bar to 100 bar.

Thereafter, the method according to the present disclosure may further include determining whether or not the internal pressure of the mold exceeds the predetermined pressure value using a mold pressure sensor 30 (S31). Upon determining that the internal pressure of the mold exceeds the predetermined pressure value (Yes in S31), the internal pressure of the mold is controlled by adjusting the gap of the mold by increasing the gap between the upper slide 21 and the lower slide 22. In determining as to whether or not the internal pressure of the mold exceeds the predetermined pressure value (S31), the internal pressure of the mold is monitored by the mold pressure sensor 30 while raising the lower slide 22 at a high speed until the gap of the mold becomes 5 mm. The control of the internal pressure of the mold is performed only when the monitored internal pressure of the mold exceeds the predetermined pressure value.

Therefore, upon determining that the internal pressure of the mold is equal to or less than the predetermined pressure value (No in S31), the composite material is manufactured by curing the preform, to which the resin is applied, while maintaining the internal pressure of the mold at the predetermined pressure value or below (S51). After the curing process is completed, the manufacturing process of the composite material is terminated (S52).

Upon determining that the internal pressure of the mold exceeds the predetermined pressure value (Yes in S31), the internal pressure of the mold is controlled by reducing the raising speed of the lower slide 22 (S41). In operation (S41), the internal pressure of the mold is controlled by reducing the raising speed of the lower slide 22. The raising speed of the lower slide 22 is adjusted depending on correlation between the closing force of the press 20 and the internal pressure of the mold. The raising speed of the lower slide 22 is adjusted by the closing force of the press 20, and thus, the lower slide 22 may be moved slower than the specifications of the press 20.

Operation S41 may include reducing the internal pressure of the mold by adjusting the raising speed of the lower slide 22 to a range of 0.01 mm/s to 0.50 mm/s.

Otherwise, the internal pressure of the mold may be controlled by adjusting the gap of the mold by increasing the gap between the upper slide 21 and the lower slide 22.

As described above with reference to FIGS. 5 and 6, one of these pressure control methods may be used, or both pressure control methods may be used or repeatedly used depending on correlations among the structure of the foam, the viscosity of the resin, and the interface between the fiber and the resin.

After operation (S41), whether or not the internal pressure of the mold exceeds the predetermined pressure value may be additionally determined using the mold pressure sensor 30 (S42). After operation S4), the internal pressure of the mold may be additionally controlled upon determining that the internal pressure of the mold exceeds the predetermined pressure value (S43).

Additionally controlling the internal pressure of the mold (S43) may include determining whether or not the force of the press becomes 0 kilonewtons (kN). Furthermore, controlling the internal pressure of the mold (S43) may include lowering the lower slide 22 when the force of the press becomes 0 kN and the internal pressure of the mold exceeds the predetermined pressure value.

Lowering the lower slide 22 may include reducing the internal pressure of the mold by lowering the lower slide 22 while adjusting the gap between the upper slide 21 and the lower slide 22 by 0.01 mm to 0.10 mm. For example, the gap between the upper slide 21 and the lower slide 22 may be adjusted by 0.01 mm to 0.05 mm.

When the internal pressure of the mold becomes equal to or less than the predetermined pressure value through operation S43, the composite material is manufactured by curing the preform to which the resin is applied to while maintaining the internal pressure of the mold at the predetermined pressure value or below (S51). Once the curing process is completed in operation S5), the manufacturing process of the composite material is terminated (S52).

Figure 7:
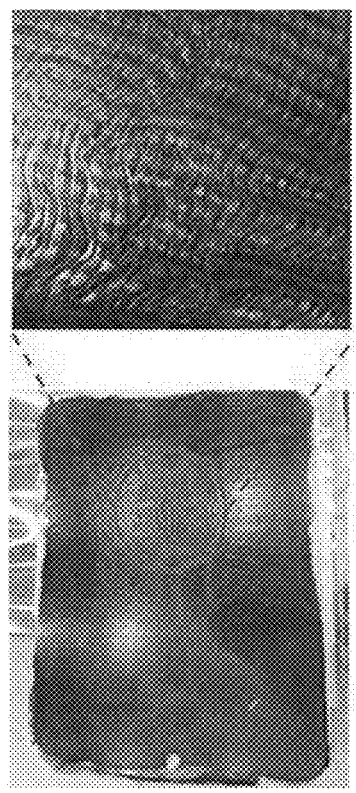
FIG. 7 is an image showing deformation of a woven fabric when a resin flows in the out-of-plane direction in a wet compression molding (WCM) process according to the present disclosure.

FIG. 7 is an image showing deformation of a woven fabric, when the resin flows in the out-of-plane direction in the wet compression molding (WCM) process according to the present disclosure. The present disclosure may prevent occurrence of the above deformation by controlling the internal pressure of the mold. Therefore, general resins which are used in the RPM process, i.e., thermosetting resins, such as polyester and polyurethane, may be applied to the present disclosure.

However, in the case in which the preform including the fiber or the foam is contracted or deformed even when the internal pressure of the mold is controlled, the following measures are considered.

The first measure is to lower viscosity of the resin by raising the temperatures of the resin and a curing agent in the mixing head 12. In this case, the gel time of the resin depending on temperature must be analyzed, and a time taken to execute operations S11 to S51 must be shorter than the gel time of the resin at a set temperature.

The second measure is to increase the flow characteristics of the resin in the in-plane direction by raising viscosity of the applied resin. This can be achieved by raising the temperature of the mold.

Further, the resin may flow down along the mold. When the resin flows down along the mold even though a proper amount of the resin is applied to the preform, pores may be formed in the manufactured composite material, and thus, the following measures are considered.

The first measure is to reduce a fluidity of the resin in the in-plane direction by lowering the surface temperature of the mold. This is because when the resin passes a sealing member of the mold, the viscosity of the resin is raised due to the surface temperature of the mold, and thus fluidity of the resin is increased. Temperature conditions may be varied depending on the size and shape of a product and characteristics of the resin.

The second measure is to design the sealing member of the mold to be located farther than the preform. The position of the sealing member of the mold may be varied depending on the size and shape of the product and the characteristics of the resin.

The method of manufacturing the composite material according to the present disclosure may prevent damage to the foam and achieve a high-speed molding of the composite material with high quality. This may be done by controlling the internal pressure of the mold during the wet compression molding (WCM) process, adjusting the speed of the lower slide 22 or adjusting the gap of the mold when the internal pressure of the mold exceeds the predetermined pressure value, and applying the resin to the upper surface of the preform within several seconds using the robot 11. This allows the use of the resin with a gel time of 2 minutes or less, maximizing the quality and productivity of the composite material.

As is apparent from the above description, a method of manufacturing composite material according to the present disclosure may prevent damage to foam and achieve high-speed molding of the composite material having high quality. This may be achieved by controlling the internal pressure of a mold during the wet compression molding (WCM) process, adjusting the speed of a lower slide 22 or adjusting the gap of the mold when the internal pressure of the mold exceeds a predetermined pressure value, and applying a resin to the upper surface of a preform within several seconds so that the resin having a gel time of 2 minutes or less may be used. Thus, the method of manufacturing composite material according to the present disclosure is capable of maximizing the quality and productivity of the composite material.

The disclosure has been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A method of manufacturing a composite material, the method comprising:
   applying, using a resin injector, a resin to an upper surface of a preform having at least one fiber and foam;
   executing, using a press, compression molding of the preform having the resin applied thereto by lowering an upper slide of a mold and raising a lower slide of a mold;
   determining, using a pressure sensor, whether or not an internal pressure of the mold exceeds a predetermined pressure value; and
   controlling the internal pressure of the mold by reducing a raising speed of the lower slide in real-time upon determining that the internal pressure of the mold exceeds the predetermined pressure value, wherein compressive strength of the foam is in a range of 10 bar to 100 bar.

2. The method of claim 1, wherein the fiber comprises at least one of glass fiber, carbon fiber, boron fiber, regenerated fiber, or any combination thereof.

3. The method of claim 1, wherein the fiber is provided in a form of at least one of unidirectional fabrics, woven fabrics, or any combination thereof.

4. The method of claim 1, wherein the resin comprises at least one of bisphenol epoxy resins, polyester resins, polyurethane resins, or any combination thereof.

5. The method of claim 1, wherein a gel time of the resin is in a range of 10 seconds to 2 minutes.

6. The method of claim 1, wherein the preform comprises a first layer having a first fiber, a second layer disposed on the first layer and having a second fiber, and a third layer disposed on the second layer and having a third fiber.

7. The method of claim 1, wherein applying the resin to the upper surface of the preform further comprises:
applying, by a robot of the resin injector, the resin to the preform by moving a mixing head mounted on the robot; and
determining whether or not an error occurs in the robot.

8. The method of claim 1, wherein executing the compression molding of the composite material further comprises:
raising the lower slide at a speed in a range of 50 millimeters per second (mm/s) to 100 mm/s when a gap between the upper slide and the lower slide is in a range of 5 millimeters (mm) to 10 mm, and raising the lower slide at a speed in a range of 0.5 mm/s to 1.0 mm/s when the gap between the upper slide and the lower slide is in a range of 2 mm to 5 mm; and
executing the compression molding of the preform.

9. The method of claim 1, further comprising:
after executing the compression molding of the preform, impregnating the preform with the resin by allowing the resin applied to the upper surface of the preform to flow downwards from an interior of the preform.

10. The method of claim 1, further comprising:
upon determining that the internal pressure of the mold exceeds the predetermined pressure value, controlling the internal pressure of the mold by adjusting a gap of the mold by increasing a gap between the upper slide and the lower slide.

11. The method of claim 1, wherein controlling the internal pressure of the mold by reducing the raising speed of the lower slide further comprises:
reducing the internal pressure of the mold by adjusting the raising speed of the lower slide to 0.01 mm/s to 0.50 mm/s.

12. The method of claim 1, further comprising:
after controlling the internal pressure of the mold, additionally controlling the internal pressure of the mold,
wherein additionally controlling the internal pressure of the mold includes
lowering the lower slide, when the internal pressure of the mold exceeds the predetermined pressure value.

13. The method of claim 12, wherein lowering the lower slide further comprises:
reducing the internal pressure of the mold by adjusting a gap between the upper slide and the lower slide by 0.01 mm to 0.10 mm.

14. The method of claim 12, further comprising:
after additionally controlling the internal pressure of the mold, and upon determining that the internal pressure of the mold becomes equal to or less than the predetermined pressure value, manufacturing the composite material by curing the preform having the resin applied thereto while maintaining the internal pressure of the mold at the predetermined pressure value or below.

15. A method of manufacturing a composite material, the method comprising:
applying, using a resin injector, a resin to an upper surface of a preform having at least one fiber and foam;
executing, using a press, compression molding of the preform having the resin applied thereto by lowering an upper slide of a mold and raising a lower slide of a mold;
determining, using a pressure sensor, whether or not an internal pressure of the mold exceeds a predetermined pressure value; and
controlling the internal pressure of the mold by reducing a raising speed of the lower slide in real-time upon determining that the internal pressure of the mold exceeds the predetermined pressure value,
wherein executing the compression molding of the composite material further comprises:
raising the lower slide at a speed in a range of 50 millimeters per second (mm/s) to 100 mm/s when a gap between the upper slide and the lower slide is in a range of 5 millimeters (mm) to 10 mm, and raising the lower slide at a speed in a range of 0.5 mm/s to 1.0 mm/s when the gap between the upper slide and the lower slide is in a range of 2 mm to 5 mm; and
executing the compression molding of the preform.

16. A method of manufacturing a composite material, the method comprising:
applying, using a resin injector, a resin to an upper surface of a preform having at least one fiber and foam;
executing, using a press, compression molding of the preform having the resin applied thereto by lowering an upper slide of a mold and raising a lower slide of a mold;
determining, using a pressure sensor, whether or not an internal pressure of the mold exceeds a predetermined pressure value; and
controlling the internal pressure of the mold by reducing a raising speed of the lower slide in real-time upon determining that the internal pressure of the mold exceeds the predetermined pressure value,
wherein controlling the internal pressure of the mold by reducing the raising speed of the lower slide further comprises:
reducing the internal pressure of the mold by adjusting the raising speed of the lower slide to 0.01 mm/s to 0.50 mm/s.

* * * * *